US012361044B2

(12) United States Patent
Sabharwal et al.

(10) Patent No.: US 12,361,044 B2
(45) Date of Patent: Jul. 15, 2025

(54) SYSTEM AND METHOD FOR AUTOMATIC IDENTIFICATION OF LEGAL ENTITIES

(71) Applicant: RELATIVITY ODA LLC, Chicago, IL (US)

(72) Inventors: Jasneet Singh Sabharwal, Vancouver (CA); Somya Anand, Vancouver (CA); Ayushi Dalmia, Vancouver (CA)

(73) Assignee: RELATIVITY ODA LLC, Chicago, IL (US)

( * ) Notice: Subject to any disclaimer, the term of this patent is extended or adjusted under 35 U.S.C. 154(b) by 139 days.

(21) Appl. No.: 18/131,819

(22) Filed: Apr. 6, 2023

(65) Prior Publication Data

US 2023/0325425 A1 Oct. 12, 2023

Related U.S. Application Data

(60) Provisional application No. 63/327,999, filed on Apr. 6, 2022.

(51) Int. Cl.
| | | |
|---|---|---|
| G06F 16/35 | (2025.01) | |
| G06N 3/0464 | (2023.01) | |
| G06Q 50/18 | (2012.01) | |

(52) U.S. Cl.
CPC .......... *G06F 16/35* (2019.01); *G06N 3/0464* (2023.01); *G06Q 50/18* (2013.01)

(58) Field of Classification Search
CPC ....... G06N 3/0464; G06N 20/10; G06Q 50/18
See application file for complete search history.

(56) References Cited

U.S. PATENT DOCUMENTS

2022/0383157 A1\* 12/2022 Dema .................... G06N 20/10

OTHER PUBLICATIONS https://dl.acm.org/doi/pdf/10.1145/3299819.3299846.\*
https://ieeexplore.ieee.org/stamp/stamp.jsp?tp=&arnumber=9446853&tag=1.\*
https://ieeexplore.ieee.org/stamp/stamp.jsp?tp=&arnumber=9443931.\*

\* cited by examiner

*Primary Examiner* — Maher N Algibhah
(74) *Attorney, Agent, or Firm* — MARSHALL, GERSTEIN & BORUN LLP; Randall G. Rueth

(57) ABSTRACT

Systems, methods, and computer readable media for identifying entities as legal entities are provided. These techniques may include accessing a corpus of documents and applying a persona prediction machine learning algorithm to classify entities associated with the corpus of documents. The persona prediction machine learning algorithm may include two layers. A first layer includes applying a signature block classifier that analyzes signature blocks of the entities. A second layer includes applying an entity classifier that analyzes a plurality of documents and/or network graphs associated with the entities. An entity database is updated to indicate the output of the persona prediction machine learning algorithm based on the signature block classifier and/or the entity classifier.

18 Claims, 4 Drawing Sheets

SYSTEM AND METHOD FOR AUTOMATIC IDENTIFICATION OF LEGAL ENTITIES

CROSS-REFERENCE TO RELATED APPLICATIONS

This Application claims the benefit of U.S. Provisional Application 63/327,999, entitled "SYSTEM AND METHOD FOR AUTOMATIC IDENTIFICATION OF LEGAL ENTITIES," filed on Apr. 6, 2022, the disclosure of which is hereby incorporated herein by reference.

FIELD OF THE DISCLOSURE

The present disclosure generally relates to the detection of particular types of entities or personas and, more specifically, to applying machine learning techniques to improve the accuracy of the identification of entities or personas.

BACKGROUND

In various applications, a need exists to classify entities indicated by documents within a corpus of documents. For example, during a discovery process for a litigation, a producing party is required to produce a corpus of documents that meets the discovery conditions. Within this corpus of documents, individual documents may be covered by one or more privileges, such as attorney-client privilege, attorney work product privilege, confidential data, and/or other types of privilege. Privileged documents need not be produced by the producing party. Accordingly, by being able to automatically identify entities as legal entities, it may be possible to automatically identify documents subject to one or more privilege claim.

Conventionally, a rule-based approach has been relied upon to identify legal entities. For example, a producing party may be able to correlate their employment records that indicate a job title (e.g., "general counsel" or "attorney") to identify some legal entities. However, a discovery request may relate to matters that are several years in the past and such records may be unavailable or incomplete for the relevant years (e.g., if the matter involves communications with outside companies). Another rule that has been relied upon is based upon an analysis of a domain name associated with the entity. For example, entities that have an email address corresponding to a law firm may be legal entities. However, not every entity associated with a law firm necessarily gives rise to a privilege claim. Moreover, a legal entity may utilize a personal email address associate with a non-legal domain name. Thus, reliance on a domain name may lead to inaccurate determinations. Accordingly, there is a need for systems and methods for automatic identification of legal entities.

BRIEF SUMMARY

In one aspect, a computer-implemented method for identifying legal entities is provided. The method includes (1) accessing, by one or more processors, a corpus of documents; (2) accessing, by the one or more processors, an entity database that includes a plurality of records respectively corresponding entities indicated by documents in the corpus of documents; and (3) executing, by the one or more processors, a persona prediction machine learning algorithm on entities included in the plurality of entities. The persona prediction machine learning algorithm includes (i) a first layer configured to apply a signature block classifier that analyzes signature blocks corresponding to a particular entity to determine whether the particular entity is a legal entity; and (ii) a second layer configured to apply an entity classifier that analyzes a set of documents associated with the entity and a network graph for the entity to determine whether the particular entity is a legal entity. The method also includes (4) updating, by one or more processors, the entity database to indicate whether the entities are legal entities based on outputs of the persona prediction machine learning algorithm.

In another aspect, a system for identifying legal entities is provided. The system includes (i) one or more processors; (ii) a communication interface communicatively coupled to a document storage system storing a corpus of documents; (iii) an entity database configured to store a plurality of records respectively corresponding to entities indicated by the corpus of documents; and (iv) one or more memories storing non-transitory, computer-readable instructions. The instructions, when executed by the one or more processors, cause the system to (1) access, via the communication interface, the corpus of documents; and (2) execute a persona prediction machine learning algorithm on entities associated with records in the entity database. The persona prediction machine learning algorithm may include (a) a first layer configured to apply a signature block classifier that analyzes signature blocks corresponding to a particular entity to determine whether the particular entity is a legal entity; and (2) a second layer configured to apply an entity classifier that analyzes a set of documents associated with the entity and a network graph for the entity to determine whether the particular entity is a legal entity. The instructions further cause the system to (3) update the entity database to indicate whether the entities are legal entities based on outputs of the persona prediction machine learning algorithm.

In another aspect, a non-transitory computer-readable storage medium storing processor-executable instructions is provided. The instructions, when executed cause one or more processors to (1) access a corpus of documents; (2) access an entity database that includes a plurality of records respectively corresponding entities indicated by documents in the corpus of documents; and (3) execute a persona prediction machine learning algorithm on entities included in the plurality of entities. The persona prediction machine learning algorithm includes (i) a first layer configured to apply a signature block classifier that analyzes signature blocks corresponding to a particular entity to determine whether the particular entity is a legal entity; and (ii) a second layer configured to apply an entity classifier that analyzes a set of documents associated with the entity and a network graph for the entity to determine whether the particular entity is a legal entity. The instructions further cause the one or more processors to (4) update the entity database to indicate whether the entities are legal entities based on outputs of the persona prediction machine learning algorithm.

DETAILED DESCRIPTION

The embodiments described herein relate to, inter alia, the automatic identification of legal entities within a corpus of electronic documents. The systems and techniques described herein may be used during an eDiscovery process that is part of a litigation. Although the present disclosure generally describes the techniques' application to the eDiscovery and/or litigation context, other applications are also possible. For example, the systems and techniques described herein may be used by a company or other entity to categorize and/or review its own archived electronic documents and/or for other purposes.

Generally, the corpus of documents described herein refers to a plurality of documents that meet one or more conditions, such as those specified by a discovery request. While the present description generally assumes that the documents are electronic documents, the instant techniques may still be applied to physical documents. For example, the physical document may be scanned into a computer system to produce an electronic equivalent document that is analyzed by applying the instant techniques. Additionally, while many examples of documents described herein are electronic communication documents, such as emails, text conversations, social media conversations, etc., the documents within the corpus of documents may be of any appropriate document type, such as image file, video file, audio file, spreadsheets, memorandums, reports, and/or other types of documents. For documents that aren't text based, the instant techniques may still be applied by applying optical character recognition (OCR) techniques, transcription techniques, and/or metadata analyses.

Figure 1:
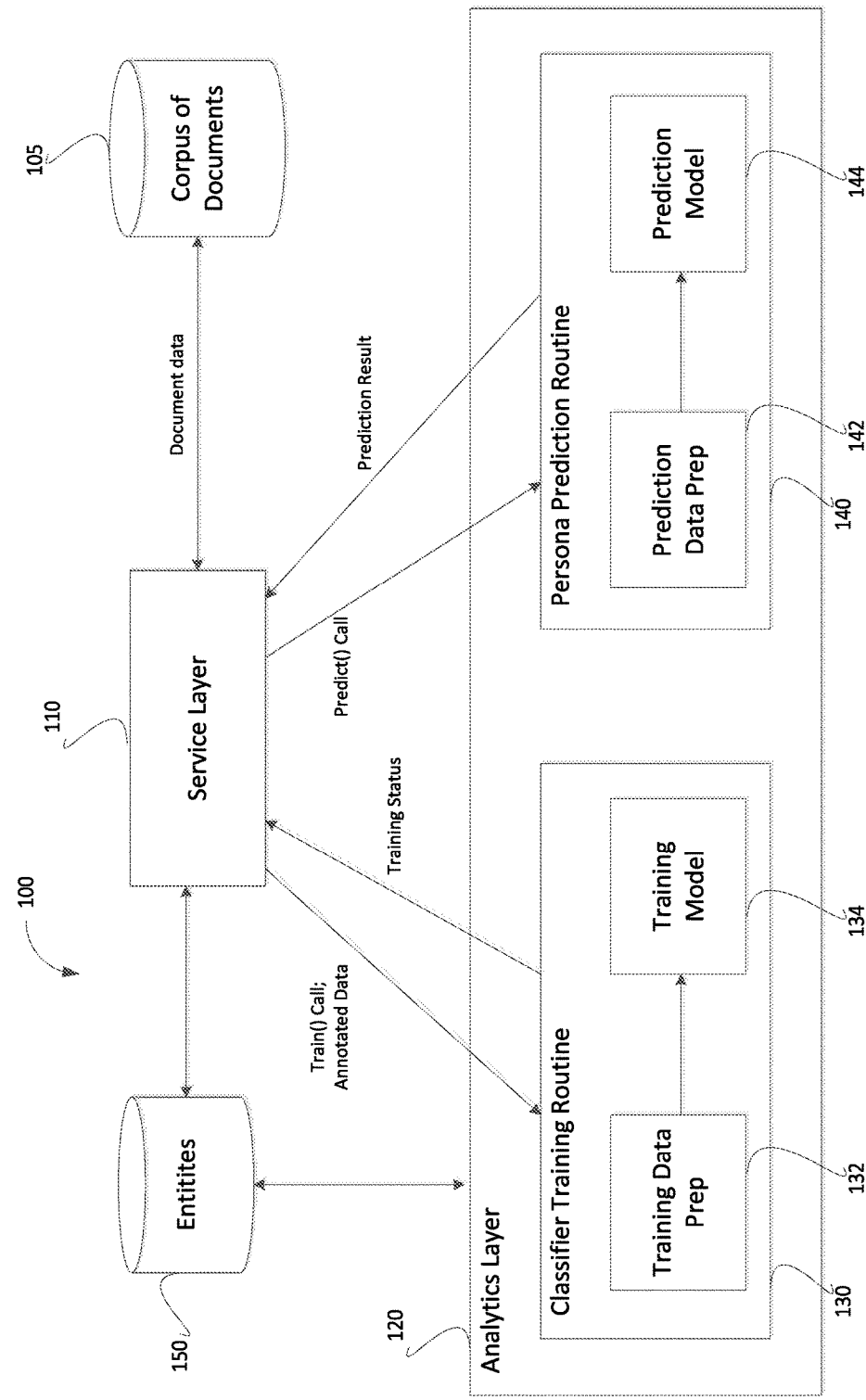
FIG. 1 depicts an example computing environment configured to automatically detect legal entities, according to one embodiment.

FIG. 1 depicts an example computing environment 100 in which the automatic persona detection techniques are applied to a corpus of documents 105, according to one embodiment. As illustrated, the example environment 100 includes two software layers—a service layer 110 configured to, inter alia, interface with documents in the corpus of documents 105 and an analytics layer 120 configured to train and apply classifiers to the documents in the corpus of documents 105. The layers 110, 120 may be implemented as software modules within a cloud and/or distributed computing system (e.g., Amazon Web Services (AWS) or Microsoft Azure). Accordingly, the layers 110, 120 may include separate logical addresses via which the software modules are accessible by other components that interface with the layers 110, 120. The layers 110, 120 may interface with one another via a bus or other messaging channel supported by the cloud computing system. In some embodiments, the layers 110 and 120 includes multiple instances of the same software module to increase the ability the parallelization for the various functions performed via the layers 110, 120.

In the example computing environment 100, the service layer 110 is configured to manage access to documents within the corpus of documents 105. In some embodiments, the corpus of documents 105 is ingested into a cloud or distributed storage system (not depicted) at which the corpus of documents is stored. To interact with a document in the corpus of documents 105, the software module may issue a corresponding function call to the service layer 110, which, in turn, interfaces with the cloud storage system to execute the indicated functional task. For example, if the software module wants to read a document from the corpus of documents, the service layer 110 may fetch the indicated document from the cloud storage system and load the document into a working memory of the cloud computing system. If the software module then modifies the fetched document (e.g., by applying a label to the document), the service layer 110 synchronizes the changes with the cloud storage system to ensure that the modification is propagated to the copy of the document maintained thereat. While the foregoing describes example operation of the service layer 110 when the corpus of documents 105 is maintained at a cloud storage system, similar techniques may be applied when the corpus of documents is maintained at a conventional database system.

In some embodiments, as part of the ingestion process, the example computing systems executes an entity extraction module (not depicted) to identify and correlate different entities indicated by documents within the corpus of documents 105. The entities may be identified in either the content of the document (e.g., in a signature block of an email or the text of text file) or in the metadata of a document (e.g., in a To:, From:, or cc: field of an email document, or an author or edited by field of a text document). After identifying any potential entities referenced in the corpus of documents 105, the entity extraction module may then correlate two references to the same entity made in two different manners. For example, if documents include references to "John Smith" and "John Q. Smith," the entity extraction module may combine the potential entity of "John Smith" and the potential entity of "John Q. Smith" into a single entity. Thus, only a single entity may be created for each real-world entity. The entity extraction module may then analyze communication documents sent by the entity to associate the entity with one or more signature blocks included in the sent communications documents.

As another example, the ingestion process may include executing a signature block extraction model configured to identify a signature block associated with the document. For example, in some embodiments, the analytics layer 120 may include the signature block extraction model as a utility available for integration with other routines executed thereat. In some embodiments, the signature block extraction model is included as part of an email parser configured to segment an email into different sections (e.g., delimiter, header, body, signature block, etc.) for each segment included therein. Accordingly, as part of the ingestion process, the computing system may invoke the signature block extraction model and associate the extracted signature block with the document itself.

The entity extraction module may store a list of entities associated with the corpus of documents 105 in an entity database 150. That is, each entity identified by the entity extraction module may correspond to a record in the entity database 150. This record may also include an indication of any signature block associated with the entity by the entity extraction module. Additionally, the record may include a reference to a database that maintains a social network graph of an organization associated with entity. The social network graph may indicate the other entities with which the entity communicates.

As will be explained in more detail below, the example computing environment 100 may define one or more personas indicative of an entity type. For example, one persona may indicate that an entity is a legal entity that may cause documents associated with the entity to be subject to a privilege claim. Accordingly, the example computing environment 100 may be configured to perform the disclosed analyses to associate entities included in the entity database 150 with one or more personas.

In the illustrated embodiment, the example computing environment 100 includes the analytics layer 120 that is configured to, inter alia, assign personas to entities included in the entity database 150. Accordingly, the example analytics layer 120 includes two routines—a classifier training routine 130 to train one or more classifiers based on the documents included in the corpus of documents 105 and a persona prediction routine 140 to predict whether or not an entity is a particular type of persona, e.g., a legal entity. It should be appreciated that the persona prediction routine 140 may apply pre-trained classifiers (e.g., those available via open source projects or classifiers trained based on documents included in a different corpus of documents) and/or classifiers trained via the classifier training routine 130 to predict the persona associated with a particular entity.

Figure 2:
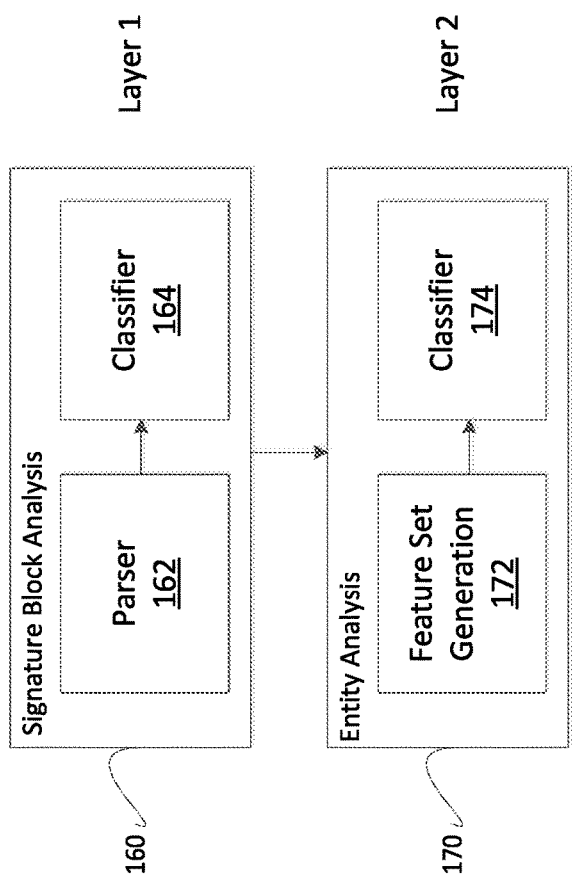
FIG. 2 depicts a prediction model structure for a prediction model configured to automatically detect legal entities, according to one embodiment.

With simultaneous reference to FIG. 2, depicted is an example model structure 145 for the prediction model 144. As illustrated, the example model structure includes two layers of analysis—(1) a first layer 160 that analyzes the signature block(s) associated with an entity to determine whether the signature block includes sufficient information to assign the entity a particular persona, and (2) a second layer 170 that analyzes a plurality of documents associated with the entity to identify features thereof that are indicative of whether an entity should be assigned a particular persona. In the example model structure 145, if the first layer 160 is able to generate a prediction as to whether or not to assign the entity a particular persona with at least a threshold certainty (e.g., 90%, 95%, 98%), then the prediction model 144 may return the prediction from the first layer 160 without reaching the analysis associated with second layer 170. It should be appreciated that the example model structure 145 is one example model structure for the prediction model 144 and, in other embodiments, alternate model structures that include additional or alternative layers and/or analyses are envisioned.

As illustrated, the example model structure 145 includes a classifier with each layer. That is, the first layer 160 includes a signature block classifier 164 and the second layer 170 includes a feature classifier 174. Accordingly, the computing environment 100 may be configured to train both the classifiers 164, 174 via the classifier training routine 130.

The classifier training routine 130 includes two subroutines—a training data preparation routine 132 configured to obtain and pre-process the training data prior to usage and a training model 134 configured to train a classifier based upon the pre-processed data. In order to train a classifier, the classifier training routine 130 may first obtain a set of annotations that act as the truth with respect to the classifier being trained. Preferably, the annotations include example entities to which the classifier being trained applies and example entities to which the classifier being trained does not apply. For example, the company subject to a discovery request may know which of its own employees are legal entities and which are not legal entities. A user may interact with a user interface to update a record in the entity database 150 to indicate which entities are definitively legal entities and which entities are definitively not legal entities.

After the annotations are received, the service layer 110 may initiate the classifier training routine 130 by issuing a train( ) call. In response, the training data preparation routine 132 may obtain the training data required to train the classifiers. In some embodiments, the train( ) call includes an indication of the prediction model 144. Accordingly, the training data preparation routine 132 may analyze the prediction model structure 145 of the indicated prediction model 144 to identify which classifiers to train. The training data preparation routine 132 may be configured to obtain different types of training data based on the classifier being trained. For example, to train the signature block classifier 164, the classifier training routine may obtain the signature block(s) from the entity database 150 for entities corresponding to an obtained annotation. As another example, to train the feature classifier 174 the classifier training routine 130 may interface with the service layer 110 to obtain a plurality of documents and/or a social network graph associated with entities corresponding to an obtained annotation. In response, the service layer 110 may fetch the requested documents from the cloud storage system and load the documents into a working memory accessible by the classifier training routine 130.

After obtaining the training data, the training data preparation routine 132 may perform one or more pre-processing techniques on the training data. For example, in some embodiments, the training data preparation routine 132 normalizes data included in the documents and/or signature blocks, for example, by removing formatting characters, standardizing metadata fields, and/or stripping out words that inappropriately influence semantic analyses (e.g., "the," "a," etc.). As another example, the training data preparation routine 132 may perform one or more de-duplication techniques on the set of documents loaded into the working memory to prevent the duplicate documents from over-weighting the analysis.

In some embodiments, a partially- or previously-trained classifier is used as a starting point for the training model 134. For example, in some scenarios, the trained classifiers may fail one or more performance metrics when the classifier is applied to unlabeled entities in the entity database 150. Accordingly, the user may provide additional annotations produced as part of the performance evaluation process. Upon receiving the additional annotations, the service layer 110 may issue a subsequent train( ) call to re-train the classifiers using the additional annotations. As another example, some classifiers may be generally applicable across multiple corpuses of documents 105. As such, a partially-trained classifier from another project or an open source location may be used as a starting point for a classifier. As yet another example, the computing environment 100 may be configured to train classifiers to support other automated techniques (e.g., to generate a privilege log). The prediction model 144 may be configured to combine the outputs of one or more of these classifiers to as part of a higher-level classifier. Accordingly, the training data preparation routine 132 may analyze the classifiers included in the prediction model 144 to identify whether any of the classifiers correspond to a classifier that is already maintained at the computing environment 100. If so, the training data preparation routine 132 may obtain data associated with the existing classifier to use as the starting point for the training model 134.

After the training data preparation routine 132 finishes preparing the training data, the classifier training routine 130 executes the training model 134 to train the classifiers associated with the prediction model 144. If the prediction model 144 includes multiple classifiers, the classifier training routine 134 may execute the training model 134 for each classifier. The training model 134 may implement any known techniques to those skilled in the art to train a classifier. Generally, the training model 134 applies a feature generation model to extract one or more features from the training data. For example, the training model 134 may generate features by applying one or more supervised learning models (e.g., support vector machines (SVM) models, a fastText model, a term frequency—inverse document frequency (TF-IDF) model, a cosine similarity model, etc.), neural network models (such as a convolutional neural network (CNN) model), and/or rules-based approaches. The training model 134 may then generate a feature space based upon the extracted features and apply one or more classifier techniques to segment the feature space. For example, the training model 134 may apply a logistic regression, a hierarchical model, and/or a neural network (including a CNN, a long short term memory (LSTM) network, or a transformer model) to define the classifier that segments the feature space. Accordingly, a classifier trained by the training model 134 may indicate how to extract the features analyzed by the classifier and the segmentation of the feature space and the corresponding classifications.

In some embodiments, the training model 134 may apply different training techniques to train different classifiers. For example, to train the signature block classifier 164, the training model 134 may to generate the feature space based on the SVM features of the signature blocks corresponding to the annotated entities (such as those extracted via the parser 162 of FIG. 2) and train a CNN model using the signature blocks of the annotated entities to predict whether or not a non-annotated entity should be assigned the persona. For the example model structure 145, the CNN may actually define three regions within the feature space—(1) a region in which there is a threshold confidence that entities should be assigned the persona, (2) a region in which there is a threshold confidence that entities should not be assigned the persona, and (3) a region in which the threshold confidence is not satisfied to decide whether or not to assign the entity the persona.

On the other hand, to train the feature classifier 174, the training model 134 may apply a rules-based approach (e.g., a set of rules defined by the feature set generation routine 172 of FIG. 2) to generate entity features and a logistic regression or SVM analysis to segment the feature space. For example, the feature classifier 174 may include a feature based upon topics associated with documents that reference the entity. To this end, the feature classifier 174 may be configured to determine if a threshold percentage of documents associated with the entity include one or more topics that are correlated to entities assigned the persona. Accordingly, the computing environment 100 may be configured to apply topic labels to documents included in the corpus of documents. For example, the computing system may implement the techniques for applying topic labels to documents described in co-pending application Ser. No. 18/131,815, the entire disclosure of which is hereby incorporated by reference. As another example, the feature classifier 174 may include a feature that relates to a graphical analysis communications associated with the entity. In some embodiments, this graphical analysis includes determining a percentage of first-degree communications associated with entities that are assigned the persona. In other embodiments, the graphical analysis incorporates second- or third-degree communications. Accordingly, the feature classifier 174 may include rules that define the process for obtaining a feature that corresponds to the topic composition and a feature that corresponds to the graphical analysis. The training model 134 may then apply the logistic regression model based on these features of the annotated entities to segment the feature space.

While the foregoing sets out example feature extraction models and classifier models for the example prediction model structure 145, other model structures may incorporate different feature extraction models and classifier models. For example, with respect to the identification of legal entities, in a typical corpus of documents, generally only 1% of the extracted entities are legal entities. Thus, the training data with positive examples of legal entities is sparse. Accordingly, while the particular models described above with respect to the example model structure 145 may be well suited to account for this data sparsity, other prediction models configured to assign other persona types may not need to account for this sparsity. Thus, the particular models implement by the prediction model 144 may be selected in view of the particularities associated with the persona being classified.

As illustrated, the classifier training routine 130 may be configured to report its status to the service layer 110. For example, the classifier training routine 130 may be configured to indicate that the training process is complete after the training model 134 finishes training the classifiers of the prediction model 144 based upon the received annotations. As another example, the classifier training routine 130 may report a status indicating that the training model 134 is still in progress of training the classifiers of the prediction model 144. Accordingly, when the classifier training routine 130 reports this status, other components of the computing environment 100 may be prevented from executing a prediction model that relies upon those classifiers.

After the classifier training routine 130 finishes training the classifiers of the prediction model 144, the analytics layer 120 is ready to begin predicting whether unlabeled entities should have a persona applied thereto. In some embodiments, the service layer 110 analyzes the entity database 150 to detect entities that do not have a persona assigned thereto. Upon detecting an entity without an assigned persona, the service layer 110 may initiate a predict( ) call to the analytics layer 120 indicating the entity to cause the persona prediction routine 140 to execute thereupon.

The persona prediction routine 140 includes two subroutines—a prediction data preparation routine 142 configured to pre-process the data upon which the prediction is based and a prediction model 144 configured to predict whether or not an unlabeled entity should be assigned a particular persona. In response to detecting a predict( ) call, the prediction data preparation routine 142 may obtain the data required to predict whether or not a persona should be assigned to the entity. In some embodiments, the predict( ) call includes an indication of the prediction model 144 to indicate which prediction model should be used. For example, if the computing environment 100 includes prediction models for multiple different personas, the predict( ) call may indicate which persona's prediction model 144 to apply.

Accordingly, the prediction data preparation routine 142 may analyze the indication of the prediction model 144 to identify what data is needed to execute the prediction model 144. For example, the prediction data preparation routine 142 may analyze the prediction model structure 145 to determine that the prediction model 144 includes a signature block classifier 164 that executes on an entity's signature block and a feature classifier 174 that executes on a plurality of documents associated with the entity. In response, the prediction data preparation routine 142 may obtain the entity's signature block from the entity database 150 and interface with the service layer 110 such that a plurality of documents associated with the entity are loaded into a working memory. Additionally, the prediction data preparation routine 142 may apply any data normalization techniques applied by the training data preparation routine 132.

After the prediction data preparation routine 142 finishes preparing the data, the persona prediction routine 140 executes the prediction model 144 defined by a prediction model structure, such as the prediction model structure of FIG. 2. As described above, the prediction model structure 145 includes two layers, a signature block analysis layer 160 and an entity analysis layer 170. The prediction model 144 may begin the prediction process by executing routines associated with the signature block analysis layer 160. Accordingly, the prediction model 144 may begin by executing a parser 162 to parse the signature block for the entity. For example, the parser 162 may implement a SVM model configured to correspond text included in the signature block with one or more fields (e.g., a job title, a degree or credential, an email domain name, a confidentiality notice, a legal notice, etc.). The data values of the fields identified by the parser 162 may represent the features upon which the classifier 164 was trained to execute upon. Accordingly, the parser 162 may generate a signature block feature vector representative of the entity's signature block to use as an input of the classifier 164.

The classifier 164 then utilizes the signature block feature vector to identify which region of the feature space the signature block feature vector is located. For example, the classifier 164 may input the signature block feature vector into a CNN to determine whether the entity should be assigned the persona, the entity should not be assigned the persona, or that further analysis is needed. If the classifier 164 determines that the entity should be assigned the persona, the prediction model 144 may return an indication to assign the persona to the entity in response to the predict( ) function call. Accordingly, the service layer 110 may update the record for the entity at entity database 150 to indicate the persona.

On the other hand, if the classifier 164 determines that the entity should not be assigned the persona, the prediction model 144 may return an indication that the persona should not be assigned to the entity in response to the predict( ) function call. Accordingly, the service layer 110 may update the record for the entity at entity database 150 to indicate that the entity is not assigned the persona. For example, the records at entity database may include a field that corresponds to each persona type. Accordingly, the service layer 110 may set this field to false or another value that indicates the entity is not associated with the persona type. As another example, a default or "other" persona may be utilized for entities that should not be assigned the persona corresponding to the prediction model 144. Accordingly, the service layer 110 may set the persona field for the entity in the entity database 150 to indicate the default or "other" persona.

If the classifier 164 determines that further analysis is needed to predict whether or not the entity should be assigned the persona, the prediction model 144 may begin executing the routines associated with the entity analysis layer 170. Accordingly, the prediction model 144 may execute the feature set generation routine 172 on the set of documents associated with the entity. As one example, the feature set generation routine 172 may identify topic composition for documents included in the set of documents. For instance, the feature set generation routine may determine a percentage of documents in the set of documents to which each topic is applied. Thus, in this example, these percentages may be features included in the entity feature vector for the entity. As another example, the feature set generation routine 172 may perform a graphical analysis, such as calculating a percentage of first-degree communications with other entities assigned the persona. In this example, the result of the graphical analysis may be another feature included in the entity feature vector for the entity.

The classifier 174 then utilizes the entity feature vector to identify which region of the feature space the entity feature vector is located. For example, the classifier 174 may indicate a boundary in the feature space defined by a logistic regression model. The classifier 174 may then predict whether the entity should be assigned the persona based upon which side of the boundary the entity feature vector resides in the feature space. That is, if the entity feature vector resides in a region of the feature space corresponding to the persona, the prediction model 144 may return an indication that the persona should be applied to the entity in response to the predict( ) call. On the other hand, if the entity feature vector resides in a region of the feature space corresponding to entities that are not assigned the persona, the prediction model 144 may return an indication that the persona should not be applied to the entity in response to the predict( ) call.

The service layer 110 may continue to call the persona prediction routine 140 until all entities included in the entity database have a persona assigned thereto. In some embodiments, after the service layer 110 calls the persona prediction routine 140 a threshold number of times (e.g., 100, 200, 500, 1000), the service layer 110 may initiate a manual review of the performance of the prediction model 144. Accordingly, the service layer 110 may present a user interface via which one or more of the predictions returned by the persona prediction routine 140 are displayed. Based on the manual review, the service layer 110 may calculate one or more performance metrics (e.g., precision, recall, accuracy) for the prediction model 144. If the service layer 110 determines that the prediction model 144 does not meet the performance metric(s), the service layer 110 may utilize the manual review as additional annotations to re-train the classifiers included in the prediction model 144. The service layer 110 may repeat this manual review process when the threshold number of predict( ) calls is reached again. Once the manual review process determines that the prediction model 144 satisfies the performance metric(s), the service layer 110 may continue to apply the prediction model 144 to any unlabeled entities in the entity database without further manual review.

Figure 3:
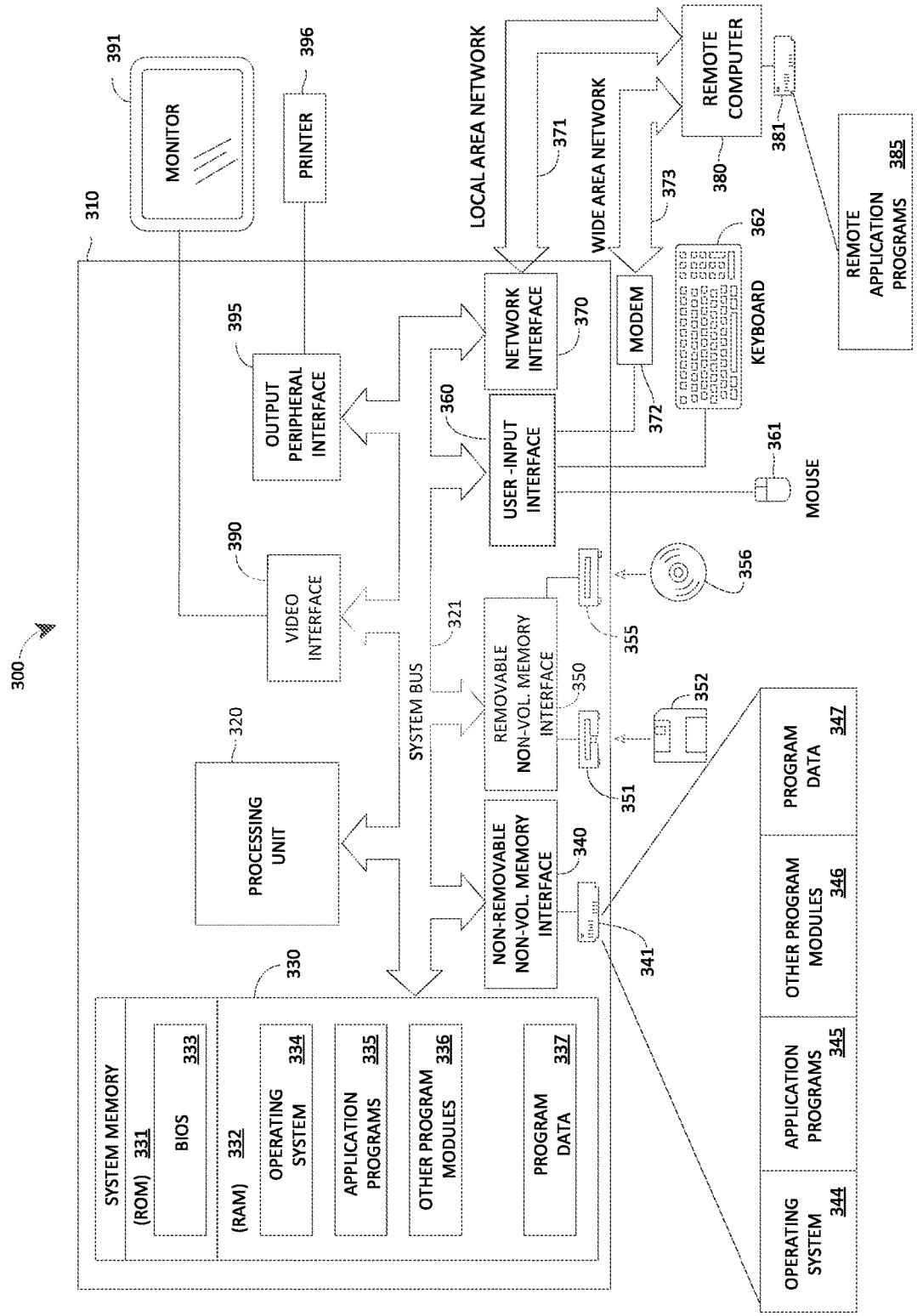
FIG. 3 depicts an example computing system in which the techniques described herein may be implemented, according to one embodiment.

Turning now to FIG. 3, FIG. 3 depicts an example computing system 300 in which the techniques described herein may be implemented, according to an embodiment. For example, the computing system 300 of FIG. 3 may be a computing system configured to implement the service layer 110 and/or the analytics layer 120 of FIG. 1. The computing system 300 may include a computer 310. Components of the computer 310 may include, but are not limited to, a processing unit 320, a system memory 330, and a system bus 321 that couples various system components including the system memory 330 to the processing unit 320. In some embodiments, the processing unit 320 may include one or more parallel processing units capable of processing data in parallel with one another. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 3 provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 3 illustrates remote application programs 385 as residing on memory device 381.

The techniques for automatically determining whether an entity should be assigned a particular persona (e.g., a legal entity persona) described above may be implemented in part or in their entirety within a computing system such as the computing system 300 illustrated in FIG. 3. In some embodiments, the computing system 300 is a server computing system communicatively coupled to a local workstation (e.g., a remote computer 380) via which a user interfaces with the computing the computing system 300. For example, the computer 310 may be configured to send predictions to the local workstation for presentation thereat to facilitate a manual review process that validates the performance of a prediction model.

In some embodiments, the computing system 300 may include any number of computers 310 configured in a cloud or distributed computing arrangement. Accordingly, the computing system 300 may include a cloud computing manager system (not depicted) that efficiently distributes the performance of the functions described herein between the computers 310 based on, for example, a resource availability of the respective processing units 320 or system memories 330 of the computers 310. In these embodiments, the documents in the corpus of documents may be stored in a cloud or distributed storage system (not depicted) accessible via the interfaces 371 or 373. Accordingly, the computer 310 may communicate with the cloud storage system to access the documents within the corpus of documents, for example, when identifying a set of documents associated with one or more entities.

Figure 4:
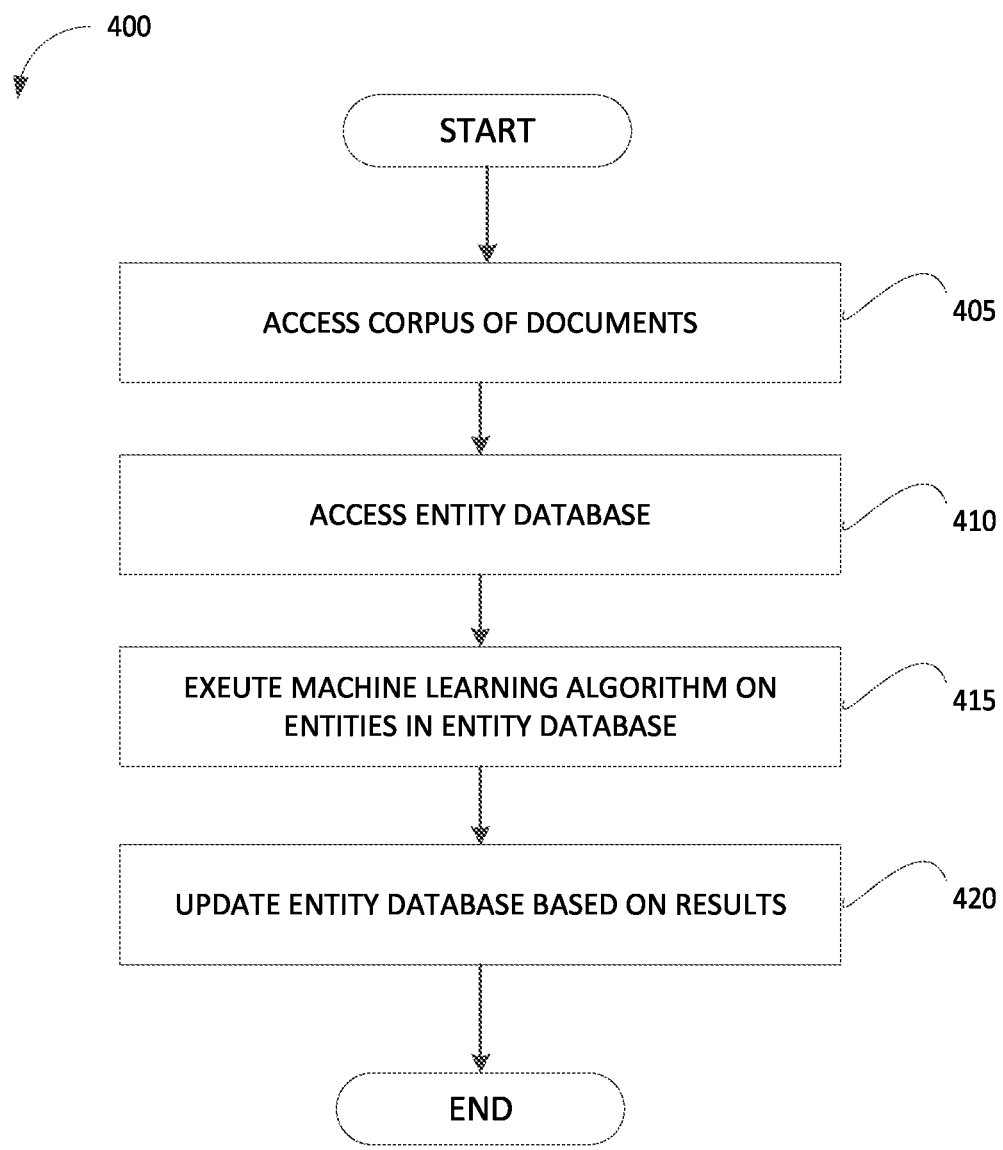
FIG. 4 depicts a flow diagram of an example method for automatic detection of legal entities, according to one embodiment.

FIG. 4 depicts a flow diagram of an example method 400 for automatic identification of entities as legal entities, in accordance with the techniques described herein. The method 400 may be implemented by one or more processors of one or more computing devices, such as the computing system 300 of FIG. 3, for example.

The method 400 may begin when the computing system accesses a corpus of documents, such as the corpus 105 of FIG. 1 (block 405). In some embodiments, the corpus of documents is ingested into a cloud storage system at which the corpus of documents is accessed. In some embodiments, as part of the ingestion process, the computing system may execute an entity extraction process to the corpus of documents to identify entities associated with the documents and/or the document metadata. The computing system may create a record of the extract entities in an entity database, such as the entity database 150 of FIG. 1.

In some embodiments, the computing system is configured to analyze documents of the corpus of documents to identify a signature block corresponding entities with records in the entity database. For example, the computing system may identify a document that is an email communication document sent by a particular entity. The computing system may identify and extract a signature block corresponding to the particular entity form the identified email communication document. In response, the computing system may update the record in the entity database corresponding to the particular entity to indicate the signature block for the particular entity.

At block 410, the computing system accesses the entity database that includes the plurality of records respectively corresponding entities indicated by documents in the corpus of documents. In one example, the computing system may be configured to receive a set of manual annotations indicating whether a set of entities are legal entities. Accordingly, the computing system may access the entity database to update the entity records corresponding to the manual annotations. In some embodiments, the computing system may also initiate training of classifiers included in a persona prediction machine learning model, such as the prediction model 144 of FIG. 1, in response to receiving the manual annotations. In another example, the computing system may access the entity database to identify entities corresponding to records that do not have an indication of a persona assigned to the entity. For example, these may be entities not associated with a manual annotation and/or entities to which the persona prediction machine learning model has not yet been applied.

At block 415, the computing system executes the persona prediction machine learning algorithm on entities included in the plurality of entities. For example, the computing system may execute the persona prediction machine learning model on the entities not associated with a manual annotation and/or entities to which the persona prediction machine learning model has not yet been applied. As described above, the persona prediction machine learning model may include (i) a first layer, such as the signature block analysis layer 160 of FIG. 2, configured to apply a signature block classifier, such as the classifier 164 of FIG. 2, that analyzes signature blocks corresponding to a particular entity to determine whether the particular entity is a legal entity; and (ii) a second layer, such as the entity analysis layer 170 of FIG. 2, configured to apply an entity classifier, such as the entity classifier 174 of FIG. 2, that analyzes a set of documents associated with the entity and a network graph for the entity to determine whether the particular entity is a legal entity. In some embodiments, the persona prediction machine learning model is configured to attempt to classify the particular entity via the first layer before applying the second layer. Accordingly, the computing system may be configured to determine that the signature block classifier does not meet a threshold confidence (e.g., 90%, 95%, 98%) in determining whether or not the particular entity is a legal entity. In response to the determination, the computing system may then apply the second layer to the particular entity.

In some embodiments, to perform the first layer of the persona prediction machine learning algorithm, the computing system may be configured to apply a parser, such as the parser 162 of FIG. 2, to parse the signature block into one or more features of the signature block. In some embodiments, the features of the signature block include an indication of one or more of a title, a credential, an email address domain, or a confidentiality notice. The computing system may then apply the signature block classifier to classify the particular entity as a legal entity based upon the one or more features of the signature block. In some embodiments, the parser is trained via a support vector machine (SVM) model and the signature block classifier is trained via a convolutional neural network (CNN) model.

In some embodiments, to perform the second layer of the persona prediction machine learning algorithm, the computing system may be configured to apply a feature set generation routine, such as the feature set generation routine 172 of FIG. 2, to generate features of the entity. For example, the feature set generation routine may generate a feature corresponding to a percentage of first-degree communications for the particular persona with other personas that are legal entities. As another example the feature set generation routine may identify one or more topics corresponding to documents in the corpus of documents associated with the particular entity. Based on the identified topics, the feature set generation routine may generate one or more features based upon the one or more identified topics. For example, the features may correspond to a percentage of documents associated with the particular entity to which the topic is applied. As another example, the feature may include a topic set of topics that are included in a threshold amount (by percentage or volume) of documents associated with the entity. The computing system may then apply entity classifier to the features generated by the feature set generation routine to predict whether the particular entity is a legal entity. In some embodiments, the entity classifier is trained via a logistic regression model.

At block 420, the computing system updates the entity database to indicate whether the entities are legal entities based on outputs of the persona prediction machine learning algorithm. For example, if the signature block classifier or the entity classifier predicts that the particular entity is a legal entity, the computing system may update the record of the particular entity in the entity database to indicate that the particular entity is a legal entity. On the hand, the signature block classifier or the entity classifier predicts that the particular entity is not a legal entity, the computing system may update the record of the particular entity in the entity database to indicate that the particular entity is not legal entity. For example, the computing system may update the record to indicate that the particular entity is a default or "other" persona.

In some embodiments, the computing system may be configured to validate the performance of the persona prediction machine learning algorithm. Accordingly, the computing system may be configured to present a plurality of outputs of the persona prediction machine learning algorithm to a user for manual review. In response, the computing system may detect indications of whether or not the machine learning algorithm correctly determined that entities are legal entities. For example, the computing system may calculate a performance metric (e.g., accuracy, precision, or recall) for the persona prediction machine learning algorithm based upon the detected indications. If the persona prediction machine learning algorithm does not meet a threshold value for the performance metric, the computing system uses the detected indications to re-train at least one of the signature block classifier or the entity classifier.

It should be appreciated that while the foregoing description of the method 400 describes a process for identify whether an entity is a legal entity, similar techniques may be applied to identify entities as other types of personas. For example, in alternate embodiments, the persona prediction machine learning algorithm may be additionally or alternatively configured to determine whether an entity is a regulator entity, a potential party to a class action litigation, or other entities.

ADDITIONAL CONSIDERATIONS

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for identifying legal entities, the method comprising:
   accessing, by one or more processors, a corpus of documents;
   accessing, by the one or more processors, an entity database that includes a plurality of records respectively corresponding to a plurality of entities indicated by documents in the corpus of documents;
   executing, by the one or more processors, a persona prediction machine learning algorithm on entities included in the plurality of entities, the persona prediction machine learning algorithm including:
      a first layer configured to apply a signature block classifier that analyzes signature blocks corresponding to a particular entity to determine whether the particular entity is a legal entity; and
      a second layer configured to apply an entity classifier that analyzes a set of documents associated with the entity and a network graph for the entity to determine whether the particular entity is a legal entity, wherein executing the persona prediction machine learning algorithm comprises:
         determining, by the one or more processors, that the signature block classifier does not meet a threshold confidence in determining whether or not the particular entity is a legal entity, and
         in response to the determination, applying, by the one or more processors, the second layer to the particular entity; and
   updating, by one or more processors, the entity database to indicate whether the entities are legal entities based on outputs of the persona prediction machine learning algorithm.

2. The computer-implemented method of claim 1, further comprising:

analyzing, by the one or more processors, documents of the corpus of documents associated with the particular entity to identify a signature block corresponding to the particular entity; and updating, by the one or more processors, the record in the entity database corresponding to the particular entity to indicate the signature block for the particular entity.

3. The computer-implemented method of claim 1, wherein performing the first layer of the persona prediction machine learning algorithm comprises:

applying, by the one or more processors, a parser to parse the signature block into one or more features of the signature block; and applying, by the one or more processors, the signature block classifier to classify the particular entity as a legal entity based upon the one or more features of the signature block.

4. The computer-implemented method of claim 3, wherein the features of the signature block include an indication of one or more of a title, a credential, an email address domain, or a confidentiality notice.

5. The computer-implemented method of claim 3, wherein the parser is trained via a support vector machine (SVM) model and the signature block classifier is trained via a convolutional neural network (CNN) model.

6. The computer-implemented method of claim 1, wherein applying the entity classifier comprises:

generating, by the one or more processors, a feature corresponding to a percentage of first-degree communications for the particular persona with other personas that are legal entities.

7. The computer-implemented method of claim 1, wherein applying the entity classifier comprises:

identifying, by the one or more processors, one or more topics corresponding to documents in the corpus of documents associated with the particular entity; and based on the identified topics, generating, by the one or more processors, one or more features based upon the one or more identified topics.

8. The computer-implemented method of claim 1, wherein the entity classifier is trained based upon a logistic regression model.

9. The computer-implemented method of claim 1, further comprising:

presenting, by the one or more processors, a plurality of outputs of the persona prediction machine learning algorithm to a user for manual review;

detecting, by the one or more processors, an indication of whether or not the persona prediction machine learning algorithm correctly determined whether entities are legal entities;

based on the detected indications, re-training, by the one or more processors, at least one of the signature block classifier or the entity classifier.

10. A system for automatically identifying legal entities, the system comprising:

one or more processors;

a communication interface communicatively coupled to a document storage system storing a corpus of documents;

an entity database configured to store a plurality of records respectively corresponding to entities indicated by the corpus of documents; and one or more memories storing non-transitory, computer-readable instructions that, when executed by the one or more processors, cause the system to:

access, via the communication interface, the corpus of documents;

execute a persona prediction machine learning algorithm on entities associated with records in the entity database, the persona prediction machine learning algorithm including:

a first layer configured to apply a signature block classifier that analyzes signature blocks corresponding to a particular entity to determine whether the particular entity is a legal entity; and a second layer configured to apply an entity classifier that analyzes a set of documents associated with the entity and a network graph for the entity to determine whether the particular entity is a legal entity, wherein the one or more processors executing the persona prediction machine learning algorithm further comprises causing the one or more processors to:

determine that the signature block classifier does not meet a threshold confidence in determining whether or not the particular entity is a legal entity, and in response to the determination, applying the second layer to the particular entity; and update the entity database to indicate whether the entities are legal entities based on outputs of the persona prediction machine learning algorithm.

11. The system of claim 10, wherein the instructions, when executed, cause the system to:

analyze documents of the corpus of documents associated with the particular entity to identify a signature block corresponding to the particular entity; and update the record in the entity database corresponding to the entity to indicate the signature block for the particular entity.

12. The system of claim 10, wherein the first layer comprises:

a parser configured to parse the signature block into one or more features of the signature block; and the signature block classifier, wherein the signature block classifier is configured to classify the particular entity as a legal entity based upon the one or more features of the signature block.

13. The system of claim 12, wherein the parser is trained via a support vector machine (SVM) model and the signature block classifier is trained via a convolutional neural network (CNN) model.

14. The system of claim 10, wherein to apply the entity classifier, the instructions, when executed, cause the system to:

generate a feature corresponding to a percentage of first-degree communications for the particular persona with other personas that are legal entities.

15. The system of claim 10, wherein to apply the entity classifier, the instructions, when executed, cause the system to:

identify one or more topics corresponding to documents in the corpus of documents associated with the particular entity; and based on the identified topics, generate one or more features based upon the one or more identified topics.

16. The system of claim 10, wherein the entity classifier is trained based upon a logistic regression model.

17. The system of claim 10, wherein the instructions, when executed, cause the system to:

present a plurality of outputs of the persona prediction machine learning algorithm to a user for manual review;

detect an indication of whether or not the machine learning algorithm correctly determined whether entities are legal entities;

based on the detected indications, re-train at least one of the signature block classifier or the entity classifier.

18. A non-transitory computer-readable storage medium storing processor-executable instructions, that when executed cause one or more processors to:

access a corpus of documents;

access an entity database that includes a plurality of records respectively corresponding a plurality of entities indicated by documents in the corpus of documents;

execute a persona prediction machine learning algorithm on entities included in the plurality of entities, the persona prediction machine learning algorithm including:

a first layer configured to apply a signature block classifier that analyzes signature blocks corresponding to a particular entity to determine whether the particular entity is a legal entity; and a second layer configured to apply an entity classifier that analyzes a set of documents associated with the entity and a network graph for the entity to determine whether the particular entity is a legal entity, wherein the one or more processors executing the persona prediction machine learning algorithm further comprises causing the one or more processors to:

determine that the signature block classifier does not meet a threshold confidence in determining whether or not the particular entity is a legal entity, and in response to the determination, applying the second layer to the particular entity; and update the entity database to indicate whether the entities are legal entities based on outputs of the persona prediction machine learning algorithm.

\* \* \* \* \*